Figure 1:
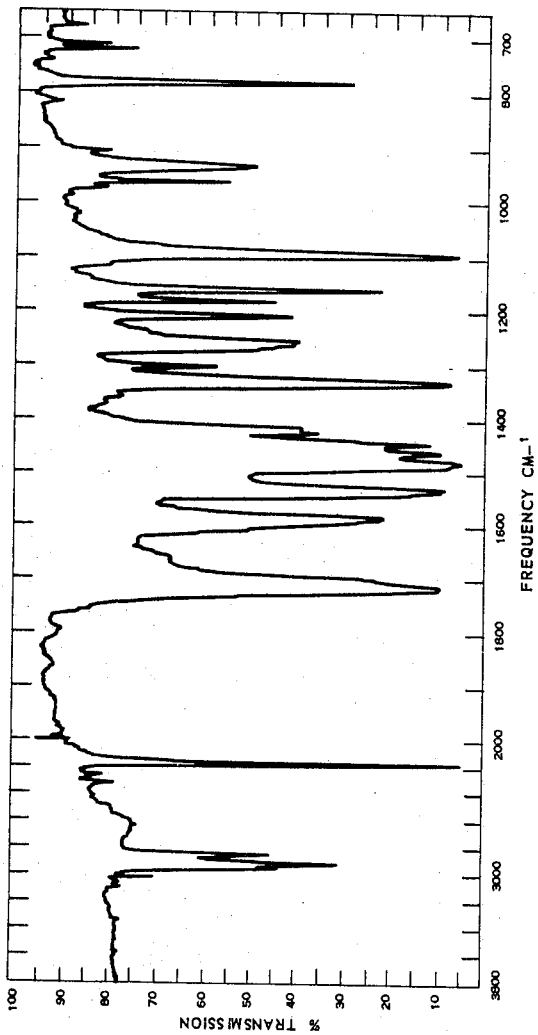

Oct. 31, 1967 M. E. BERGY ETAL 3,350,269
CREMEOMYCIN AND PROCESS FOR MAKING
Filed Sept. 19, 1966

2 Sheets-Sheet 1

FIGURE I
INFRARED ABSORPTION SPECTRUM OF CREMEOMYCIN

MALCOLM E. BERGY
THOMAS R. PYKE
INVENTORS

ATTORNEYS

PAPERGRAM OF CREMEOMYCIN

United States Patent Office 3,350,269
Patented Oct. 31, 1967

3,350,269
CREMEOMYCIN AND PROCESS FOR MAKING
Malcolm E. Bergy, Kalamazoo, and Thomas R. Pyke, Prairie Ronde Township, Kalamazoo County, Mich., assignors to The Upjohn Company, Kalamazoo, Mich., a corporation of Delaware
Filed Sept. 19, 1966, Ser. No. 580,295
10 Claims. (Cl. 167—65)

This invention relates to a novel composition of matter and to a process for the production thereof. More particularly, this invention relates to a new compound, cremeomycin (U–23,643), and to a process for the production thereof.

Cremeomycin is a chemical compound which is producible by culturing a cremeomycin-producing actinomycete in an aqueous nutrient medium. It is an acidic compound which has the property of adversely affecting the growth of Gram-positive and Gram-negative bacteria, for example, *Staphylococcus aureus, Bacillus subtilis, Bacillus cereus, Sarcina lutea, Salmonella gallinarum, Proteus vulgaris, Escherichia coli, Salmonella schottmuelleri,* and *Pseudomonas fluorescens.* Cremeomycin also has antifungel activity against various fungi, for example, *Blastomyces dermatitidis, Cryptococcus neoformans, Tricophyton rubrum, Tricophyton violaceum, Tricophyton asteroides, Tricophyton mentogrophytes, Nocardia asteroides, Coccidioides immitis, Hormodendrum compactum, Microsporum canis, Tricophyton interdigitale, Candida albicans, Sporotrichum schenckii,* and *Geotrichum sp.* Accordingly, cremeomycin can be used alone or in combination with other antibiotic agents to prevent the growth of or reduce the number of bacteria and fungi, as disclosed above, in various environments. For example, it can be used as a disinfectant on various dental and medical equipment contaminated with *Staphylococcus aureus.* It is also useful as an antifungal agent in industrial preservatives, for example, as an antifungal rinse for laundered clothes and for impregnating papers and fabrics; and it is useful for suppressing the fungal growth of sensitive organisms in plate assays and other biological media. Cremeomycin also can be used as a feed supplement to promote the growth of animals, for example, mammals, birds, fish, and reptiles. Cremeomycin has the property of being extremely photosensitive. Thus, cremeomycin can be used in various environments to inhibit the growth of susceptible microorganisms and then cremeomycin can be destroyed by merely subjecting it to an effective destructive intensity of light.

*Chemical and physical properties of cremeomycin*

Crystalline cremeomycin has the following chemical and physical properties:

Color: Yellow.
Elemental analyses: C, 49.66; H, 3.42; O, 32.77; N, 15.19.
Empirical formula: $C_8H_6N_2O_4$.
Molecular weight: 193 (titration). 194 (mass spectrometer).
Solubilities: Soluble in water, methanol, acetone, butanol, ethyl acetate, methyl ethyl ketone, methylene chloride; but not soluble in cyclohexane, petroleum ether, or hexane.
Melting point: 142–143° C.
Ultraviolet absorption spectrum:
  Methanol—
    Max. at 209 m$\mu$, a=131.36
    Max. at 264 m$\mu$, a=43.11
    Max. at 286 m$\mu$, a=34.43
    Max. at 412 m$\mu$, a=36.23
  0.01 N HCl in methanol—
    Max. at 212 m$\mu$, a=111.30
    Max. at 262.5 m$\mu$, a=48.55
    Max. at 285 m$\mu$, a=29.29
    Max. at 412 m$\mu$, a=29.42
  0.01 N KOH in water—
    Max. at 207 m$\mu$, a=36.71
    Max. at 234 m$\mu$, a=47.05
    Max. at 255 m$\mu$, a=34.18
    Max. at 279 m$\mu$, a=29.96
    Max. at 320 m$\mu$, a=9.28
    Max. at 415 m$\mu$, a=21.15

Infrared spectrum: The infrared absorption spectrum of cremeomycin suspended in mineral oil mull is reproduced in FIGURE 1 of the drawing. Cremeomycin shows bands at the following wave-lengths expressed in reciprocal centimeters:

| | |
|---|---|
| 3100 (w) | 1378 (w) (oil) |
| 3050 (w) | 1363 (w) |
| 3025 (w) | 1335 (s) |
| 2950 (s) (oil) | 1308 (m) |
| 2920 (s) (oil) | 1265 (m) |
| 2850 (s) (oil) | 1260 (s) |
| 2630 (w) | 1214 (s) |
| 2420 (w) | 1188 (m) |
| 2320 (w) | 1167 (s) |
| 2260 (w) | 1145 (w) |
| 2185 (s) | 1120 (w) |
| 1820 (w) | 1100 (s) |
| 1811 (w) | 976 (w) |
| 1718 (s) | 965 (m) |
| 1662 (m) | 936 (m) |
| 1587 (s) | 911 (w) |
| 1535 (s) | 820 (w) |
| 1490 (s) | 784 (s) |
| 1483 (s) | 740 (w) |
| 1465 (s) | 721 (w) |
| 1448 (s) | 711 (w) |
| 1428 (s) | 677 (w) |
| 1420 (s) | |

Cremeomycin shows bands at the following wave-lengths expressed in reciprocal centimeters when pressed in a KBr disc:

| | |
|---|---|
| 3100 (w) | 1363 (w) |
| 3050 (w) | 1335 (s) |
| 3025 (w) | 1308 (m) |
| 2950 (w) | 1265 (m) |
| 2850 (w) | 1260 (s) |
| 2630 (w) | 1214 (s) |
| 2420 (w) | 1188 (m) |
| 2320 (w) | 1167 (s) |
| 2260 (w) | 1145 (w) |
| 2185 (s) | 1120 (w) |
| 1820 (w) | 1100 (s) |
| 1811 (w) | 976 (w) |
| 1718 (s) | 965 (m) |
| 1662 (m) | 936 (m) |
| 1587 (s) | 911 (w) |
| 1535 (s) | 820 (w) |
| 1490 (s) | 784 (s) |
| 1483 (s) | 740 (w) |
| 1465 (s) | 721 (w) |
| 1448 (s) | 711 (w) |
| 1428 (s) | 677 (w) |
| 1420 (s) | |

Band intensities are indicated as "s," "m," and "w," respectively, and are approximated in terms of the backgrounds in the vicinity of the band. An "s" band is of the same order of intensity as the strongest in the spectrum; "m" bands are between one-third and two-thirds as intense as the strongest band; and "w" bands are less than one-third as intense as the strongest band. These estimates are made on the basis of a percent transmission scale.

Figure 2:
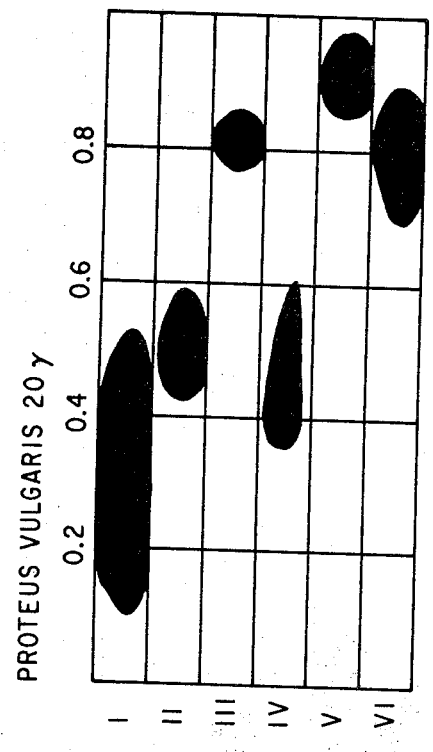

Crememoycin has a characteristic papergram pattern as shown in FIGURE 2 of the drawing when using the following solvent systems:

(I) 1-butanol, water (84:16), 16 hours.
(II) 1-butanol, water (84:16), plus 0.25% p-toluenesulfonic acid, 16 hours.
(III) 1-butanol, acetic acid, water (2:1:1), 16 hours.
(IV) 2% piperidine (v./v.) in 1-butanol, water (84:16), 16 hours.
(V) 1-butaonal, water (4:96), 5 hours.
(VI) 1-butanol, water (4:96), plus 0.25% p-toluenesulfonic acid, 5 hours.

The microorganism

The actinomycete used according to this invention for the production of cremeomycin is *Actinomyces cremeus*. One of its strain characteristics is the production of cremeomycin. A subculture of the living organism can be obtained from the permanent collection of the Northern Utilization and Research Division, Agricultural Research Service, U.S. Department of Agriculture, Peoria, Illinois, U.S.A. Its accession number in this repository is NRRL 3241.

The characteristics of *Actinomyces cremeus*, NRRL 3241, are given in the following tables:

TABLE I—Appearance on Ektachrome
TABLE II—Microscopic characteristics
TABLE III—Cultural characteristics
TABLE IV—Growth on carbon compounds in synthetic medium (J. Bact. 56:107–114, 1948).
TABLE V—Color Characteristics—According to the Color Harmony Manual, 3rd Edition, 1948, and the ISCC–NBS Method of Desginating Colors and a Dictionary of Color Names, NBS Circular 553.

TABLE I.—APPEARANCE OF *Actinomyces cremeus* ON EKTACHROME *

| Agar Medium | Surface | Reverse |
| --- | --- | --- |
| Bennett's | Cream pink | Yellow-tan. |
| Czapek's Sucrose | Trace white | Colorless. |
| Maltose Tryptone | Very slight trace white | Yellow-tan. |
| Peptone-Iron | No aerial growth | Do. |
| 0.1% Tyrosine | Pink white | Red-tan. |
| Casein Starch | Trace white | Pale yellow-tan. |

*Dietz, A., "Ektachrome Transparencies as Aids in Actinomycete Classification," Annals of the New York Academy of Sciences, 60:152–154, 1954.

TABLE II.—MICROSCOPIC CHARACTERISTICS OF *Actinomyces cremeus*

| | |
| --- | --- |
| Light Microscope | Sporophores straight to open spiral to spiral. |
| Electron Microscope | Direct: Spores elongate, smooth. Carbon replica: Spores ridged. |

TABLE III.—CULTURAL CHARACTERISTICS OF *Actinomyces cremeus*

| Medium | (Aerial Growth) Surface | (Vegetative Growth) Reverse | Other |
| --- | --- | --- | --- |
| Peptone-Iron Agar | Trace gray-white | Yellow-tan | Melanin−. |
| Calcium Malate Agar | Do. | Colorless | No pigment. Malate not solubilized. |
| Glucose Asparagine Agar | Cream white | Orange yellow | Tan pigment. |
| Skim Milk Agar | Very slight trace of white | Yellow-tan | Yellow-tan pigment. Casein slightly solubilized. |
| Tyrosine Agar | Cream | Red-brown | Red-brown. Tyrosine solubilized. |
| Xanthine Agar | Fair cream | Yellow | Pale yellow pigment. Xanthine solubilized. |
| Yeast Extract-Malt Extract Agar | Heavy cream | Orange-yellow | Yellow-tan pigment. |
| Casein Starch Agar | Fair white | Yellow | No pigment. Starch hydrolyzed. |
| Bennett's Agar | Heavy cream | Yellow-tan | No pigment. |
| Czapek's Sucrose Agar | Trace cream-white | Cream | Do. |
| Maltose Tryptone Agar | Heavy cream | Yellow-tan | Do. |
| Plain Gelatin | | | No pigment. ½ liquefied. |
| Nutrient Gelatin | | | Do. |
| Synthetic Nitrate Broth | | Slight surface ring. Trace growth throughout. | No pigment. Nitrate reduced to nitrite. |
| Nutrient Nitrate Broth | Cream aerial growth on surface ring. | | Do. |
| Litmus Milk | | Blue-green surface ring | Very slight trace of peptonization. No coagulation. pH 7.0. |

TABLE IV.—GROWTH OF *Actinomyces cremeus* ON CARBON COMPOUNDS IN SYNTHETIC MEDIUM Control:
1. D-xylose — (+)
2. L-arabinose — +
3. Rhamnose — (−)
4. D-fructose — +
5. D-galactose — +
6. D-glucose — +
7. D-mannose — +
8. Maltose — (+)
9. Sucrose — (−)
10. Lactose — (+)
11. Cellobiose — +
12. Raffinose — (−)
13. Dextrin — +
14. Inulin — (−)
15. Soluble Starch — +
16. Glycerol — +
17. Dulcitol — −
18. D-mannitol — −
19. D-sorbitol — −
20. Inositol — −
21. Salicin — −
22. Phenol — −
23. Cresol — −
24. Na Formate — −
25. Na Oxalate — −
26. Na Tartrate — −
27. Na Salicylate — +
28. Na Acetate — −
29. Na Citrate — (−)
30. Na Succinate — (−)

+=Good growth.
(+)=Moderate growth.
(−)=Slight growth.
−=No growth.

TABLE V.—COLOR CHARACTERISTICS OF *Actinomyces cremenus*

| | Color Harmony Manual, 3rd Ed., 1948 | National Bureau of Standards Circular 553, 1955 |
|---|---|---|
| Bennett's Agar: | | |
| Surface | 3 ba. (g.) pearl, shell tint | |
| Reverse | 2 ic. (g.) honey gold, light gold | 87 gm. moderate yellow. |
| Pigment | None | |
| Czapek's Sucrose Agar: | | |
| Surface | 2 db. (g.) ivory | 89 gm. pale yellow, 90 g. grayish-yellow. |
| Reverse | ...do | Do. |
| Pigment | None | |
| Maltose Tryptone Agar: | | |
| Surface | 2 ca. (m.) light ivory, eggshell | 89 gm. pale yellow. |
| Reverse | 3 pe. (m.) amber, topaz | 72 m. dark orange-yellow. 74 gm. strong yellowish-brown. |
| Pigment | None | |

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, corn starch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distiller's solubles, animal peptone liquors, meat and bone scraps, and the like. Combination of these carbon and nitrogen sources can be used advantageously. Trace metals, for example, zinc, magnesium, manganese, cobalt, iron, and the like need not be added to the fermentation media since tap water and purified ingredients are used as media components.

Production of the compound of the invention can be effected at any temperature conducive to satisfactory growth of the microorganism, for example, between about 18° and 40° C. and preferably between about 20° and 32° C. Ordinarily, optimum production of the compound is obtained in about 2 to 10 days. The medium normally stays fairly close to neutral, or on the alkaline side during the fermentation. The final pH is dependent, in part, on the buffers present, if any, and in part on the initial pH of the culture medium which is advantageously adjusted to about pH 7.2 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is an acidic chemical compound having the formula $C_8H_6N_2O_4$. It is soluble in water and in ethyl acetate, amyl acetate, butyl acetate, and like aliphatic esters; acetone, methyl ethyl ketone, isopropyl butyl ketone, and like lower alkanones; methanol, butanol, and like lower alkanols. It is relatively insoluble in cyclohexane, petroleum ether, and hexane.

A variety of procedures can be employed in the isolation and purification of cremeomycin, for example, solvent extraction, silica gel chromatography, liquid-liquid distribution in a Craig apparatus, and crystallization from solvents. Solvent extraction procedures are preferred for commercial recovery, inasmuch as they are less time consuming and less expensive. Silicia gel chromatography is a preferred purification procedure.

In a preferred recovery process, cremeomycin is recovered from its culture medium by separation of the mycelia and undissolved solids by conventional means such as by filtration or centrifugation. The antibiotic is then removed from the filtered or centrifuged broth by extraction. For the extraction of cremeomycin from the filtered broth, solvents in which it is soluble, as disclosed above, can be used. Methylene chloride is the preferred extraction solvent. The extract obtained by methylene chloride extraction can be concentrated in vacuo and freeze-dried to provide a crude preparation of the antibiotic. This preparation can be used in environments where higher purity of the antibiotic is not necessary.

Cremeomycin can be extracted from filtered fermentation beer at pH's of about 4.0 or lower. At aqueous pH's of about 6.0 or higher, cremeomycin does not extract appreciably into the above solvents in which it is soluble. Using this property, cremeomycin can be extracted at a pH less than 4.0 into one of the above solvents in which it is soluble. It then can be back-extracted into water at a pH greater than 6.0, and then re-extracted at a pH less than 4.0 into a solvent in which it is more soluble. The final extract can then be concentrated to dryness to provide a crude preparation of cremeomycin.

Alternatively, cremeomycin can be separated from the culture medium by use of a strongly basic anion exchange resin. Suitable anion exchange resins for this purpose are obtained by chloromethylating by the procedure given on pages 88 and 97 of Kunin, Ion Exchange Resins, 2nd Ed., (1958), John Willey and Sons, Inc., polystyrene cross-linekd, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex-1, Dowex-2, Dowex-3, Amberlite IRA-400, Duolite A-102, and Permatit S-1.

As a further alternative, cremeomycin can be recovered from the culture medium or the organic extract by adsorption techniques, employing such adsorbents as silicic acid, decolorizing carbon or decolorizing resin (a suitable decolorizing resin is Permutit DR, U.S. Patent 2,702,263Q, alumina and Florisil (a synthetic silicate of the type described in U.S. Patent 2,393,625 and sold by the Floridin Co.). The adsorbed antibiotic can be removed from the adsorbent in relatively pure form by elution with a suitable organic solvent, e.g., one of those mentioned above in which cremeomycin is soluble.

High purity cremeomycin can be obtained by subjecting an impure dry preparation of cremeomycin, as described above, to silica gel chromatography and crystallization using solvents such as methylene chloride and methanol to develop the column. Fractions obtained from silica gel chromatography can be concentrated to obtain crystalline cremeomycin.

Salts of cremeomycin are formed employing the free acid of cremeomycin and an inorganic or organic base. The cremeomycin salts can be prepared, as for example, by dissolving cremeomycin free acid in water, adding a dilute base until the pH of the solution is about 10.0 to 11.0, and freeze-drying the solution to provide a dried residue consisting of the cremeomycin salt. Cremeomycin salts which can be formed include the sodium, potassium, and calcium salts. Other salts of cremeomycin, including those with organic bases such as primary, secondary, and tertiary monoamines as well as with polyamines, also can be formed using the above-described or other commonly employed procedures. Other valuable salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide, and the like; phenylalkylamines such as adrenaline, ephedrine, and the like; choline, and others. Salts of cremeomycin can be used for the same biological purposes as the free acid.

Cremeomycin has a broad antibacterial spectrum as shown in Table VI. The antibacterial spectrum was determined by using an agar diffusion assay procedure which is as follows: A 1 mg./ml. solution of cremeomycin was prepared in 0.1 M pH 6.0 phosphate buffer under subdued light conditions. Trays of agar medium seeded with the appropriate test organisms were prepared and tested by dipping a 12.7 mm. filter paper disc into the test solution and placing it on the agar surface. Zones of inhibition were recorded after 18 hours incubation at a temperature of 37° C.

TABLE VI.—ANTIBACTERIAL ACTIVITY OF CREMEOMYCIN AGAR DIFFUSION ASSAY

| Test organism: | Zone of inhibition (diameter in mm.) |
|---|---|
| Pseudomonas mildenbergii | 39 |
| Mycobacterium avium | 25 |
| Klebsiella pneumoniae | 31 |
| Bacillus subtilis | 43 |
| Sarcina lutea | 48 |
| Escherichia coli | 36 |
| Salmonella gallinarum | 43 |
| Salmonella schottmuelleri | 44 |
| Staphylococcus aureus | 42 |

The antibacterial spectrum of cremeomycin was also determined by using a tube dilution assay procedure with the medium being BHI (Brain Heart Infusion Broth, Difco, Detroit, Mich.). Assay tubes (13 mm. x 100 mm.) were prepared in the customary manner as set out in Snell, E. E., Vitamin Methods, Volume 1, Academic Press, Inc., New York, 1950, page 327. Test organisms grown for 18 hours at 37° C. were used to inoculate the test medium. The assays were read at 17 hours.

TABLE VII.—ANTIBACTERIAL ACTIVITY OF CREMEOMYCIN TUBE DILUTION ASSAY

| Test organism: | Minimum inhibitory Concentration in mcg./ml. |
|---|---|
| Salmonella gallinarum | 7.8 |
| Salmonella typhosa | 7.8 |
| Salmonella paratyphi | 15.6 |
| Klebsiella pneumoniae | 31.2 |
| Escherichia coli | 15.6 |
| Proteus vulgaris | 15.6 |
| Pseudomonas aeruginosa | 62.5 |
| Pseudomonas fluorescens | 7.8 |
| Streptococcus hemolyticus | 31.2 |
| Streptococcus faecalis | 62.5 |
| Staphylococcus aureus | 15.6 |

Cremeomycin has antifungal activity as shown in Table VIII. The antifungal spectrum was determined by agar dilution plate assay.

TABLE VIII.—ANTIFUNGAL ACTIVITY OF CREMEOMYCIN

| Test organism: | Minimum inhibitory Concentration in mcg./ml. |
|---|---|
| Nocardia asteroides | 100 |
| Blastomyces dermatitidis | 100 |
| Coccidioides immitis | 1000 |
| Geotrichum sp. | 1000 |
| Hormodendrum compactum | 100 |
| Cryptococcus neoformans | 100 |
| Histoplasma capsulatum | 1000 |
| Sporotrichum schenckii | 1000 |
| Monosporium apiospermum | 1000 |
| Trichophyton rubrum | 1000 |
| Microsporum canis | 1000 |
| Trichophyton interdigitale | 1000 |
| Candida albicans | 1000 |
| Trichophyton violaceum | 100 |
| Trichophyton asteroides | 1000 |
| Trichophyton mentagrophytes | 100 |

NOTE.—Since cremeomycin is extremely light sensitive, it is important that the assay is conducted under subdued light.

The new compound of the invention, cremeomycin, is active against Bacillus subtilis and can be used to minimize or prevent odor in fish and fish crates caused by this organism. It also can be used for treating breeding places of silkworms to prevent or minimize infections caused by this organism. Also, since cremeomycin is active against Cryptococcus neoformans, it can be used to treat pigeon roosts to inhibit this fungus which has been found in pigeon droppings. (Journal of the American Medical Association, Volume 191, No. 4, Jan. 25, 1965, pages 269–274). The novel compound of the invention also can be used as the antifungal agent in the shoe uppers disclosed in U.S. Patent 3,130,505. Furthermore, the novel antibiotic of the invention can be used to swab laboratory benches and equipment in a microbiological laboratory.

The following examples are illustrative of the process and products of the present invention, but are not to be construed as limiting. All percentages are by weight and all solvent mixture proportions are by volume unless otherwise noted.

EXAMPLE 1

(A) Fermentation

A soil stock of Actinomyces cremeus, NRRL 3241, was used to inoculate a series of 500-ml. Erlenmeyer flasks, each containing 100-ml. of preseed medium consisting of the following ingredients:

| | |
|---|---|
| Glucose monohydrate | g./liter__ 25 |
| Pharmamedia [1] | do____ 25 |
| Tap water q.s. | liter__ 1 |

[1] Pharmamedia is an industrial grade of cottonseed flour produced by Trader's Oil Mill Company, Fort Worth, Tex.

The presterilization pH is adjusted to 7.2 with aqueous NaOH.

The flasks were incubated at 28° C. for 47 hours on a Gump rotary shaker operating at 260 r.p.m.

One shake flask of the preseed described above (100 ml.) was used to inoculate a 30-liter seed tank containing 20 liters of sterile seed medium consisting of the following ingredients:

| | |
|---|---|
| Glucose monohydrate | g./liter__ 10 |
| Corn steep liquor | do____ 10 |
| Pharamedia | do____ 2 |
| Wilson's Peptone Liquor No. 159 [1] | do____ 10 |
| Tap water | Balance |

[1] Wilson's Peptone Liquor No. 159 is a preparation of hydrolyzed proteins of animal origin.

The prestilization pH is adjusted to 7.2 with aqueous NaOH.

The seed tank was grown for 47 hours at a temperature of 28° C., with aeration at a rate of 10 standard liters per minute, and agitation at a rate of 400 r.p.m.

A portion of the seed (12.5 liters), described above, was used to inoculate a 300-liter fermentor containing 250 liters of the following sterile medium:

| | | |
|---|---|---|
| Black strap molasses | g./liter | 20 |
| Pharmamedia | do | 10 |
| Calcium carbonate | do | 5 |
| Lard oil | ml./liter | 5 |
| Tap water | | Balance |

The presterilization pH was adjusted to 7.2 with aqueous NaOH. The fermentation proceeded for 114 hours, during which time the temperature was controlled at 25° C., filtered air was supplied at a rate of 150 standard liters per minute, and agitation was at the rate of 320 r.p.m. At 74 hours, the fermentation broth assayed 2.6 biounits of cremeomycin. At 114 hours, the fermentation broth assayed 34.8 biounits of cremeomycin. The assays were conducted against the microorganism *Proteus vulgaris* on the medium nutrient agar (Difco). The medium was seeded with the test organism at the rate of 2 ml./liter of medium. The plates were incubated at 32° C. for 18 hours. All assay operations were conducted under subdued light. A biounit is that amount of antibiotic, when dissolved in 0.08 ml. of the test solution and applied to a 12.7 mm. disc, which gives a 20 ml. zone of inhibition under standard microbiological conditions.

(B) *Recovery*

The whole beer (2250 ml.) from a cremeomycin fermentation, as described above, was adjusted to a pH of about 4.0 with sulfuric acid and filtered using 3 percent diatomaceous earth as filter acid. The filter cake was washed with one-tenth volume of water. The filtrate (filtered beer and wash) was adjusted to a pH of about 4.0 with sulfuric acid and extracted with one-half volume of Skellysolve B (isomeric hexanes). The Skellysolve B extracts were discarded. The extracted filtrate was then adjusted to pH 4.0 with sulfuric acid and then extracted with one-half volume of methylene chloride. The spent beer was discarded. The methylene chloride extract (1050 ml.) was concentrated in vacuo at less than 30° C. to a 250 mg. preparation of cremeomycin assaying 31.0 $\mu$/mg. on the *Proteus vulgaris* assay.

(C) *Purification—silica gel chromatography*

A cremeomycin methylene chloride concentrate, obtained from a process as described above, was purified on a silica gel chromatography column. The column was prepared as follows: A mixture of salts containing 217.6 grams of $KH_2PO_4$ and 2.16 grams of $Na_2HPO_4$ was dissolved in approximately 3.0 liters of water, and the solution was mixed with 4.0 kg. of silica gel. The excess water was removed by evaporation and the buffered gel was activated at a gel temperature of 120–130° C. for about two hours and cooled to room temperature. It was then slurried with a sufficient quantity of Skellysolve B to provide a pourable mixture which was also fluid enough in consistency to allow the escape of air pockets. This mixture was poured into a four inch ID glass column and packed to a constant bed height of 41 inches. Because of the unstable nature of cremeomycin to light, all operations, with respect to the antibiotic, were performed under subdued light conditions.

A methylene chloride concentrate of cremeomycin (6.0 liters), as obtained from a process described in Part B, was concentrated in vacuo to a volume of about 100–200 ml. This concentrate was mixed with 120 grams of silica gel which had been buffered and activated as above. The solvent was removed by evaporation and the dried silica gel-antibiotic preparation mixture was distributed evenly into the head of Skellysolve B remaining on top of the column bed. The level of solvent was drained to the level of the starting material. A solvent mixture, composed of methylene chloride and methanol (98.5:1.5) was carefully added to the top of the column. Flow was started and 30 liters of this mixture was passed through the column and discarded. Development of the column was continued and one-liter fractions were collected and analyzed by measuring the UV adsorption of sample aliquots which had been blown to dryness and the solids reconstituted in methanol. The cremeomycin was recognized in the fractions by its characteristic UV spectrum, in methanol, and was quantitated by its absorbance at 285–288 m$\mu$ wave length.

Fractions 1 through 7 contained the bulk of the cremeomycin activity and they were, therefore, combined and concentrated in vacuo, at less than 40° C. to a volume of approximately 500 ml. This concentrate was clarified by filtration and concentrated in vacuo to a volume of 320 ml. To this concentrate, 1200 ml. of cyclohexane was added with stirring and held at 0° C. overnight. The crystals of cremeomycin were removed by filtration, washed with 5.0 ml. of cyclohexane, and dried in vacuo at room temperature to a constant weight of 6.08 grams assaying 198 $\mu$/mg. on the *Proteus vulgaris* microbiological assay. A portion of this crystalline preparation of cremeomycin was recrystallized by dissolving 2 grams of this preparation in 40 ml. of methylene chloride, clarifying the solution by filtration and adding 160 ml. cyclohexane. This mixture was stored overnight at 0° C. The crystals of cremeomycin were removed by filtration and dried in vacuo to a constant weight of 2.0 grams, assaying 240 $\mu$/mg. on the *Proteus vulgaris* microbiological assay.

EXAMPLE 2

*Potassium salt of cremeomycin*

Cremeomycin (0.5 gram), as prepared in Example 1, is dissolved in 5 ml. of absolute ethanol and to the solution is added 260 mg. of potassium bicarbonate dissolved in 2 ml. of water. The reaction vessel is refrigerated whereupon the potassium salt of cremeomycin crystallizes. The crystals are filtered, and dried in vacuo.

We claim:

1. A composition of matter assaying at least 2.6 biounits of cremeomycin per ml., a compound which
   (a) is effective in inhibiting the growth of various Gram-negative and Gram-positive bacteria, and fungi; and in its essentially pure crystalline form,
   (b) is soluble in ethyl acetate, amyl acetate, water, methanol, acetone, butanol, methyl ethyl ketone, and methylene chloride;
   (c) has the following elemental analyses: C, 49.66; H, 3.42; N, 15.19; O, 32.77;
   (d) has a molecular weight of 194 as determined by mass spectrometer;
   (e) has a characteristic infrared absorption spectrum as shown in FIGURE 1 of the accompanying drawing; and
   (f) has a characteristic papergram pattern as shown in FIGURE 2 of the accompanying drawing.

2. The composition of matter of claim 1 in dry form, said composition of matter assaying at least 31.0 $\mu$/mg. on the *Proteus vulgaris* assay.

3. The compound, cremeomycin, according to claim 1, in its essentially pure form.

4. The compound, cremeomycin, according to claim 1, in its essentially pure crystalline form.

5. A compound selected from the group consisting of cremeomycin, according to claim 1, and salts thereof with alkali metals, alkaline earth metals, and amines.

6. The composition of matter of claim 1 in the form of its potassium salt.

7. A process for making the compound defined in claim 1 which comprises cultivating a cremeomycin-producing strain of *Actinomyces cremeus* in an aqueous nutrient medium under aerobic conditions until substantial activity is imparted to said medium by the production of cremeomycin, and isolating cremeomycin from the culture medium.

8. A process according to claim 7 which comprises cultivating *Actinomyces cremeus* in an aqueous nutrient medium under areobic conditions until substantial activity is imparted to said medium by the production of cremeomycin.

9. A process according to claim 7 which comprises cultivating *Actinomyces cremeus* in an aqueous nutrient medium containing a source of assimilable carbohydrate and assimilable nitrogen under aerobic conditions until substantial activity is imparted to said medium by the production of cremeomycin, and isolating the cremeomycin so produced.

10. A process according to claim 9 in which the isolation comprises filtering the medium, extracting the resulting filtrate with a water-immiscible solvent for cremeomycin, and recovering cremeomycin from the solvent extract.

References Cited
UNITED STATES PATENTS

| | | | |
|---|---|---|---|
| 2,982,689 | 5/1961 | Donovick et al. | 167—65 |
| 3,072,531 | 1/1963 | Godtfredsen et al. | 167—65 |
| 3,097,137 | 7/1963 | Beer et al. | 167—65 |

ALBERT T. MEYERS, *Primary Examiner.*

J. GOLDBERG, *Assistant Examiner.*